(12) United States Patent
Fay et al.

(10) Patent No.: US 7,340,407 B1
(45) Date of Patent: Mar. 4, 2008

(54) SOUND CONTROL METHOD

(75) Inventors: Ralph Michael Fay, Lakewood, CO (US); Lawrence J. Gelin, Littleton, CO (US); Francis J. Babineau, Jr., Parker, CO (US); Brandon Dillan Tinianov, Littleton, CO (US)

(73) Assignee: Johns Manville, Denver, CO (US)

( * ) Notice: Subject to any disclaimer, the term of this patent is extended or adjusted under 35 U.S.C. 154(b) by 957 days.

(21) Appl. No.: 09/709,323

(22) Filed: Nov. 13, 2000

(51) Int. Cl.
 *G06F 9/44* (2006.01)
(52) U.S. Cl. .......................................... 705/7
(58) Field of Classification Search .............. 705/7
 See application file for complete search history.

(56) References Cited

U.S. PATENT DOCUMENTS 6,751,322 B1 * 6/2004 Carlbom et al. .............. 381/63

OTHER PUBLICATIONS

Higgins, Jill. "Don't Just Sit There." Appliance, vol. 56, No. 2, p. 109, Feb. 1999.*
Gornick, Tina. "The Quest for Quiet." Appliance, vol. 54, No. 12, p. 51, Dec. 1997.*
SoundPLAN web pages {URL: http://web.archive.org/web/*/www.soundplan.com}, archived from Mar. 6, 2000 through Mar. 7, 2000 by web.archive.org, retrieved by Examiner on Jan. 9, 2005 and Jan. 10, 2005.*
"AZONIC's Acoustical Analysis Service Determines Optimum Noise and Reverberation Reduction Before Purchase." News Release, p. 1, Oct. 1, 1990 (retrieved from Dialog File 16, The Gale Group).*
Monks et al. "Audioptimization: Goal-Based Acoustic Design." IEEE, pp. 76-91, May/Jun. 2001.*
Johns Manville, *The Basics of Sound Control*, Jul. 1997, pp. 1-14, OEM Insulations, Denver, CO.
Johns Manville, *Sound Advice—Acoustical Products and Solutions from the Leader in Sound Control*, May 2000, pp. 1-6, Johns Manville Insulations, Denver, CO.
Johns Manville, *Applied Technology Laboratories—Your Partners in Problem Solving*, pp. 1-6, Johns Manville Technical Center, Littleton, CO.
*Sound Control For Commercial And Residential Buildings*, Dec. 1997, pp. 1-24, PUB # B1405, North American Insulation Manufacturers Association, Alexandria, VA.

* cited by examiner

*Primary Examiner*—Susanna M. Diaz
(74) *Attorney, Agent, or Firm*—Robert D. Touslee

(57) ABSTRACT

A system for acoustical performance enhancement, where combinations of component solutions are tested or modeled and given performance ratings. A builder desiring an sound control upgrade forwards project information, such as building plans and the desired performance level, to a design department. The project information is reviewed and a combination of component solutions is determined to increase the performance level of the home to the desired level. The project information is then modified according to the selected combination and presented to the builder. Because the combination of component solutions has been tested and addresses all possible acoustical weak links in the project, confidence of obtaining the final desired performance level in the project is high.

28 Claims, 6 Drawing Sheets

SOUND CONTROL METHOD

BACKGROUND OF THE INVENTION

1. Field of the Invention

The present invention relates generally to enhancing the performance of a project and more particularly to enhancing the acoustical performance of a structure.

2. Background Information

Sound is an energy which is generated by a source, transmitted through a medium, and received by a receiver. It is measured by its power pressure level at various frequencies, typically represented by octave and ⅓ octave bands. The magnitude of the sound's power and pressure level for a given bandwidth is measured and expressed in units called decibels (dB). The higher the decibel level, the greater the intensity of the sound being transmitted for the bandwidth being measured.

The human ear is more sensitive to some frequencies than to others. The ear perceives a 1000 Hertz (Hz) tone as louder than a tone at 200 Hz or 4000 Hz, even though all three tones may have the same decibel level. Table 1 relates sound levels to common sound sources.

TABLE 1

Examples of Sound Sources and Associated Human Response

| Source | dB | Sensory Response |
| --- | --- | --- |
| Threshold of good hearing | 10 | Very faint |
| Whispered conversation at 6 ft. | 30 | Faint |
| Conversational speech at 3 ft. | 60 | Moderate |
| Computer printout room | 80 | Loud |
| Loud rock band | 110 | Threshold of discomfort |
| Passenger ramp at jet airliner | 120 | Threshold of pain |
| Military jet takeoff at 100 ft. | 140 | Extreme danger |

A person's response to a sound is dependent on changes in sound pressure level, the spectral content and temporal variation of the sound source, and any background noise that may be present. The human ear does not perceive sound changes in direct proportion to the change in decibel levels. For example, to perceive a halving or doubling of loudness, the sound pressure must be changed by about 10 dB. Table 2 demonstrates the relationship between sound power level changes and human perception.

TABLE 2

Sound Power Level Changes and Human Perception

| Sound Power Level Decrease | Perception |
| --- | --- |
| 0-3 dB | Barely perceivable |
| 4-5 dB | Perceivable and significant |
| 6 dB | Resultant sound level ¾ of initial level |
| 7-9 dB | Major perceived reduction |
| 10 dB | Resultant sound level ½ of initial level |

The ability of a structural component (e.g., a wall or a door) to block or absorb sound transmission from one room to another is often represented as a single-number rating called Sound Transmission Class (STC), as described by the American Society For Testing and Materials (ASTM). This rating is calculated by measuring in decibels the transmission loss at several frequencies under controlled test conditions and then calculating the single-number rating from a prescribed method. Table 3 provides an indication of the effectiveness of various STC ratings in reducing the speech transmission from one room in a structure to an adjacent room.

TABLE 3

STC Ratings and Approximate Speech Transmission Reduction

| STC | Privacy Afforded |
| --- | --- |
| 25 | Normal speech easily understood |
| 30 | Normal speech audible, but unintelligible |
| 35 | Loud speech understood |
| 40 | Loud speech audible, but unintelligible |
| 45 | Loud speech barely audible |
| 50 | Shouting barely audible |
| 55 | Shouting not audible |

When an actual constructed system is concerned, however, where conditions such as humidity and interior volume are not controlled in a laboratory environment, the single-number rating describing the acoustical performance of such a system can be expressed as a field STC rating (FSTC), which approximates a STC rating. The higher the FSTC rating of a constructed system, the greater the transmission loss.

In building modern residential structures, such as single-family houses, an important factor to consider is noise control. In order to provide a livable and quiet environment, sounds created by sources such as televisions or conversation must be controlled and reduced to comfortable decibel levels. In the case of commercial structures, such as offices and hotels, builders often have available to them complete acoustical performance packages which have resulted from years of experience and testing. Such packages are able to achieve high and consistent FSTC ratings, largely because the structures involved are usually of such typical geometry and configuration as to allow for the successful re-application of tried-and-true methods from one building to the next. However, for builders of residential structures, which can vary considerably in layout, such proven, complete, and economical system packages are not available.

In addition, materials used in commercial construction generally provide higher sound transmission loss levels that those used in residential construction. With the use of such elements as concrete floors, floors with gypcrete toppings, and resilient steel studs in wall assemblies, sound transmission loss is not compromised by any one floor or wall assembly. Also, with the specification of such components as acoustical doors (e.g., for private conference rooms), opportunities are few where a high-performing component is installed with a low-performing component. In contrast, materials and components used in typical residential construction result in systems made up of components performing at equally low transmission loss levels. Because of this, the acoustical performance levels of all of the components (e.g., floors, walls, and doors) have to be improved to an approximately equal level in order to achieve a substantial acoustical benefit.

Currently, two main options are available to builders for achieving some amount of noise control in residential structures. One method involves an acoustical upgrade by an insulation subcontractor or another type of subcontractor. Production builders, i.e., non-custom builders, may offer home buyers an acoustical insulation upgrade as one of the options associated with constructing a single-family structure. Such an upgrade is normally installed by an insulation subcontractor concurrently with the required thermal insulation. Some acoustical upgrades involve a simple solution applied to an entire structure, but most apply to limited areas of a house, such as bedrooms, laundry rooms, or bathrooms. Acoustical upgrades are also sometimes offered in packages of varying price, each commensurate with the amount of work to be performed. For example, a "good" option may only include fiber glass sound control insulation in interior walls and some floors. A "better" option could further include the caulking of gaps and perimeter joints in walls, which are normally left untreated. For a "best" option, an insulation contractor in conjunction with the drywall contractor may also install resilient channels between the studs and the drywall, or joists and a gypsum ceiling.

The above scenario results in a residential structure that has slightly improved acoustical isolation between rooms. The performance improvement could be described in terms of A-weighted sound pressure level (dBA), and an expected improvement using the described method might be 1-10 dBA, depending on what components are measured and where. Although some home buyers may perceive that the rooms within their house have been "sound deadened," the current good/better/best package upgrades do not actually provide significant measurable benefits.

The reason for this is because all of the rooms still contain several acoustical weak links or acoustical short circuits that the currently offered acoustical upgrades do not address. As mentioned above, the performance levels of all the components used in building a residential structure have to be improved to an approximately equal performance level in order to achieve a substantial acoustical benefit. Current upgrades, in contrast, only address segments of a system, such as doors or walls, as opposed to an entire system (i.e., a combination of segments). In room-to-room acoustics, one can only achieve a FSTC rating slightly better than the performance of the weakest link; sound follows the path of least resistance. For example, a wall built with resilient channels and fiber glass batts may provide an STC of 42 (in a controlled environment), but if that wall contains a typical solid core or hollow core interior door with a STC of 20, then the wall plus door will only yield an overall STC of around 21-24. Similar weak links occur with electrical outlets, background noise, HVAC ducts, structural flanking, and plumbing. Flanking paths (i.e., sound leakage) can be present even when the surrounding construction is of good quality. Direct HVAC ductwork and direct electrical outlet positioning between rooms and corridors also create escape routes for sound (i.e., cross-talk).

The other method for enhancing acoustical performance in a residential structure involves an acoustical expert, whom a custom builder relies on for advice. An acoustical expert will typically review the building plans and systematically inspect areas of house, detecting most of the weak links and addressing them using textbook principles and previous experience. In many cases, acoustical experts are able to correct many of the weak links, but academic principles usually fail to factor in the interactions of the "real world," e.g., location and type of framing members, short circuits, leaks, etc. Complete acoustical enhancement systems that are both practical and economical are not contained within reference texts. Therefore, an acoustical expert would likely overdesign some of the necessary acoustical components and overcome other obstacles with extra mass and expensive solutions.

Presently, no complete, practical, and economical acoustics package system, balancing solutions to all possible weak links, is available for the production and semi-custom home segments.

SUMMARY OF THE INVENTION

Accordingly, the present invention is directed to a system that allows a builder to substantially enhance the acoustical performance of a structure in a practical and economical manner.

According to a first embodiment of the present invention, a method is provided for enhancing performance of a project, including the steps of inputting project information, including a desired performance level, and selecting enhancement solutions based on the project information.

According to a second embodiment of the present invention, a system is provided for enhancing performance of a project, whereby the system comprises a central computer for receiving project information, a control center containing a plurality of enhancement solutions, and a reviewer for determining a combination of enhancement solutions based on the received project information.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals and wherein.

DETAILED DESCRIPTION OF THE INVENTION

In a typical home, one without any additional sound control components, the sound isolation between rooms of the home is minimal. The architectural components that prevent sound transmission between rooms, e.g., walls, floors, and doors, may 1) perform poorly on an individual basis, 2) have compromised performance due to leaks, penetrating items such as HVAC ducts, or poor construction details, or 3) perform poorly as a complete system due to structural flanking. In order for the built environment of a home to achieve a high level of sound isolation between rooms, each architectural or mechanical path for noise transmission between rooms must be addressed to a high and similar or nearly equal degree. This is manifested in two cases, where in the first case sound traveling from a source to a receiver through multiple paths is addressed to an equal performance level along each path. In the second case, a room that could receive noise from multiple sources has the paths from each source treated to an equal performance level.

Figure 3:
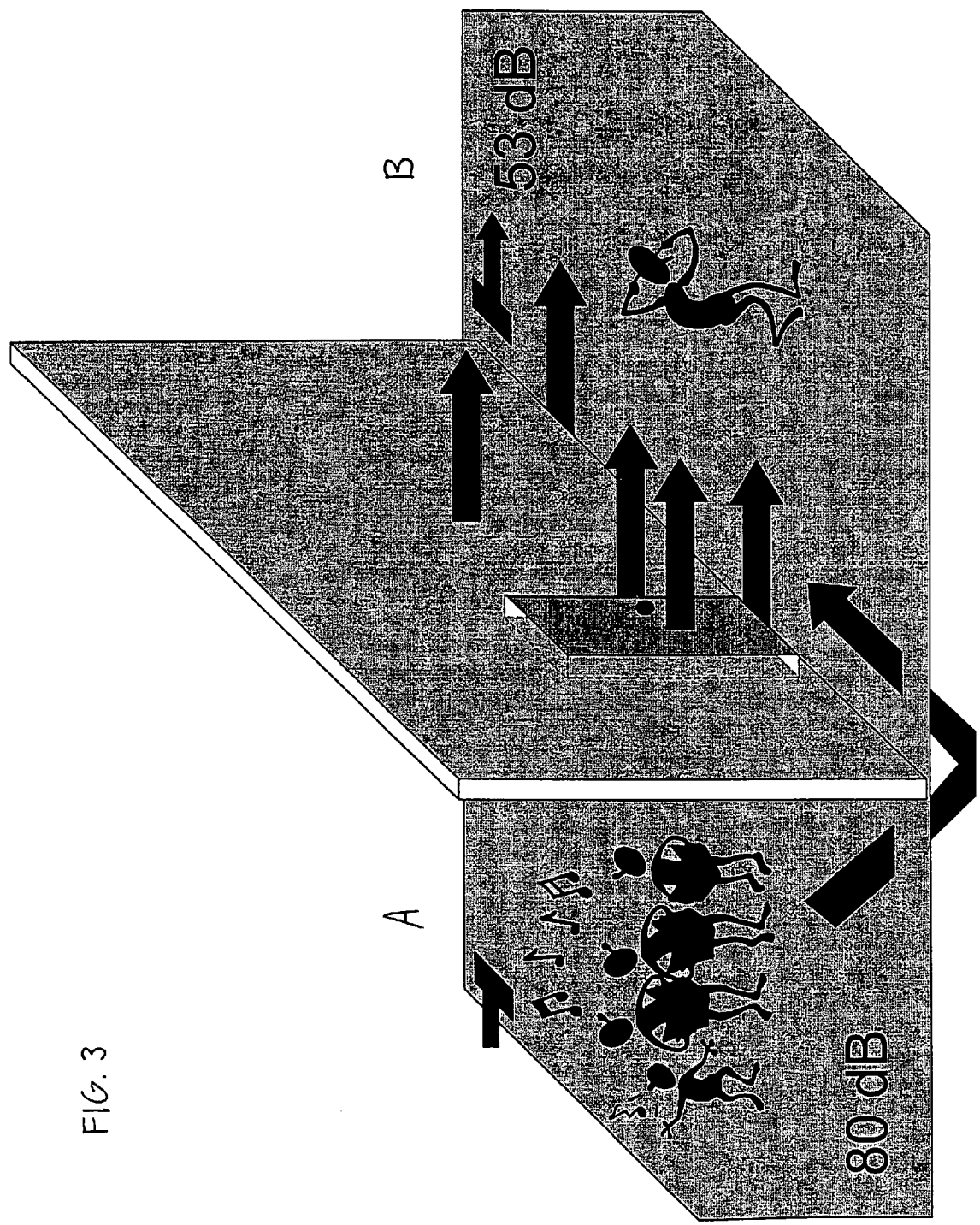
FIGS. 3-7 illustrate various levels of sound control performance between two rooms in a residential structure.
Figure 4:
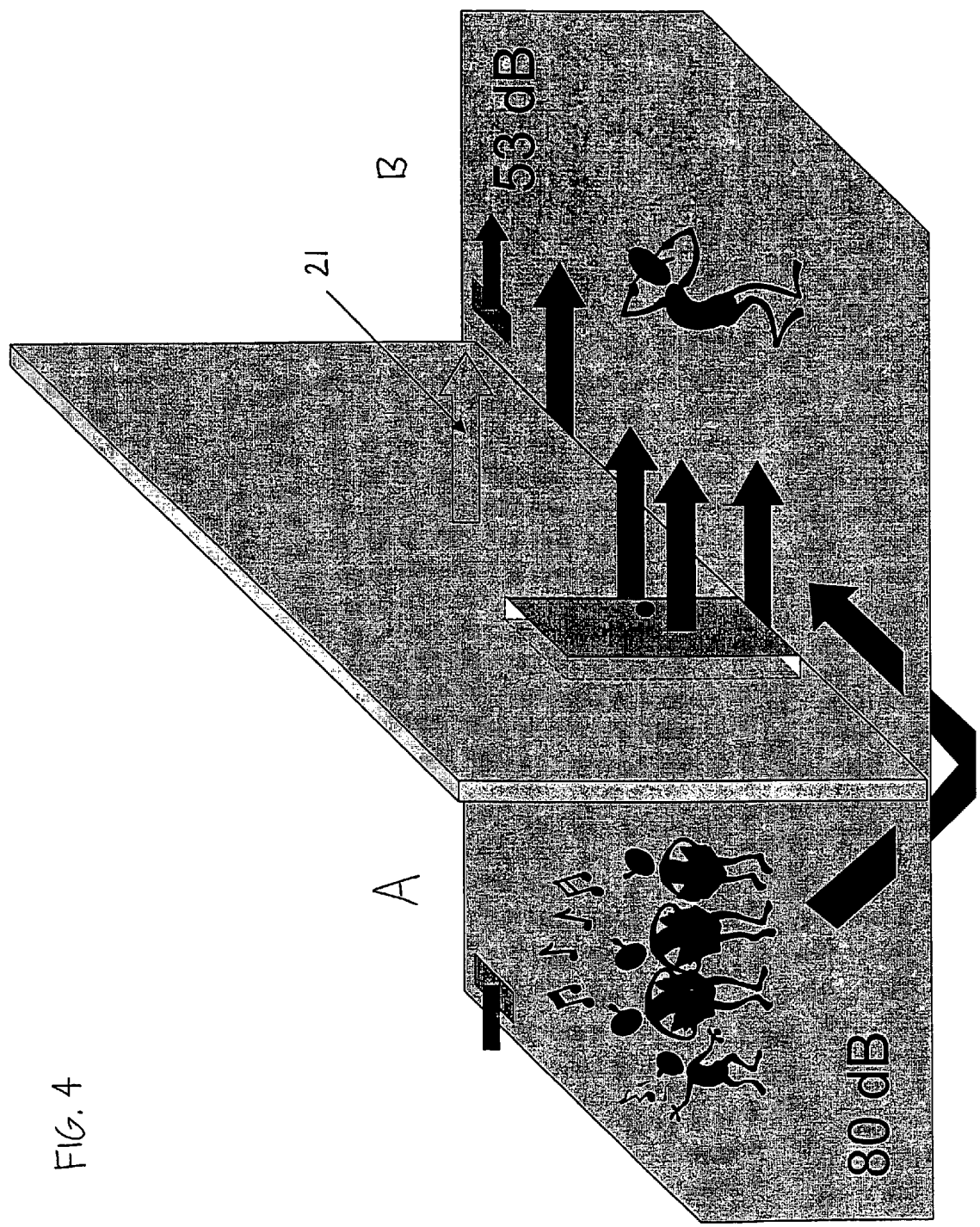
Figure 5:
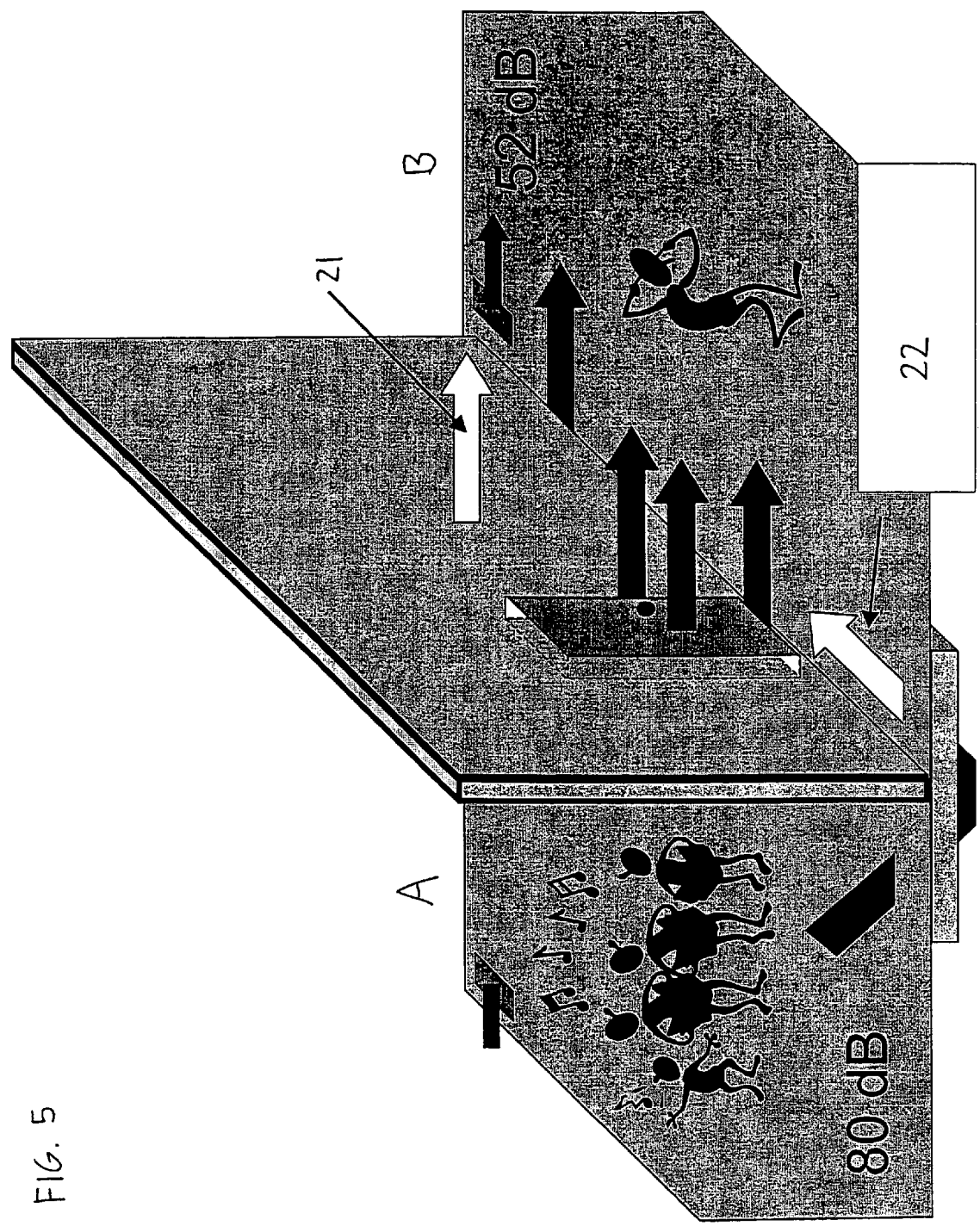
Figure 6:
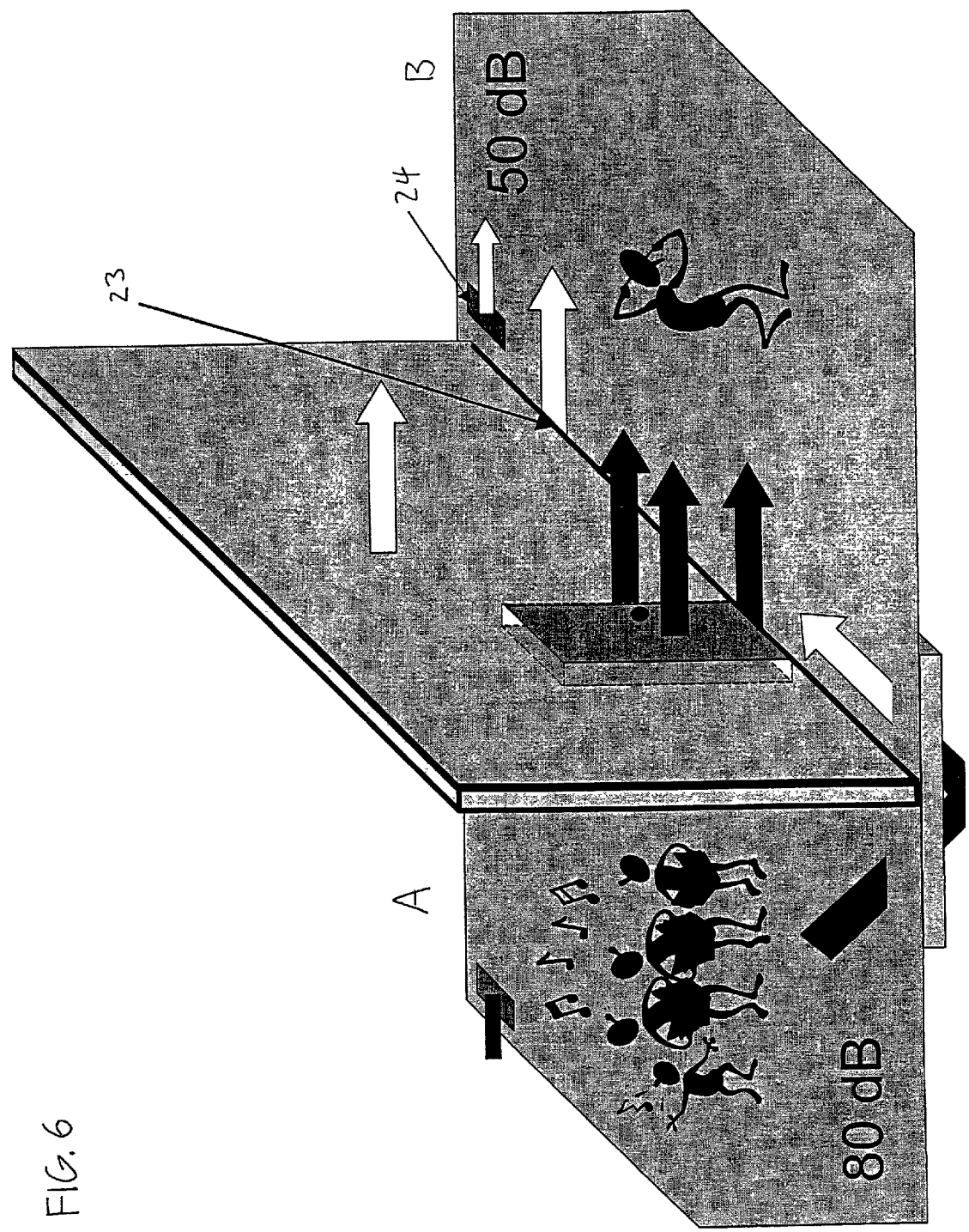

The importance of treating each architectural or mechanical path for noise transmission is demonstrated in FIGS. 3-7 where a room with a source of noise is adjacent to a room where the occupant desires quiet (e.g., for reading, sleeping, studying, or relaxing). In FIG. 3, 80 dB of sound from room A of a typical house travels by way of multiple paths (e.g, through the walls, floor, door, etc.) to room B, where an occupant is bothered by the 53 dB of transmitted sound. The addition of a noise abatement material such as fiber glass insulation or a sound control board into the wall path 21, shown in FIG. 4, offers an component-level drop of 2 dB to 3 dB, but has virtually no effect on the overall sound transmission. The addition of sound control material into the underfloor path 22, shown in FIG. 5, also has only a minimal overall effect, even though the floor as a path may experience an 8 dB benefit. In FIG. 6, caulk is introduced around the floor perimeter 23 to reduce sound leaks and duct liner is added to the duct 24 to reduce cross-talk. However, these changes, even in conjunction with the sound blockage of the wall and underfloor paths, only results in around a 3 dB improvement over the unmodified room system.

Figure 7:
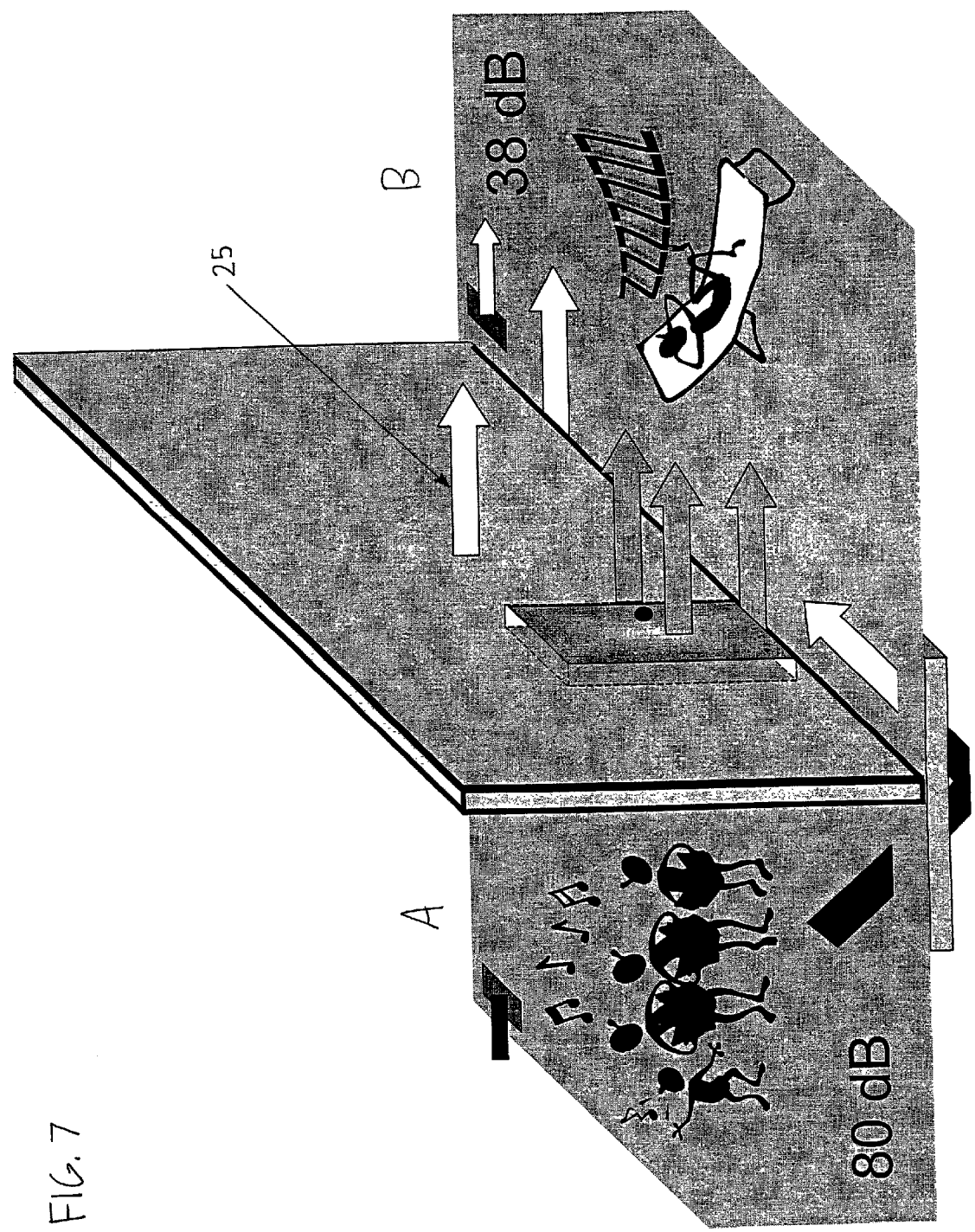

The reason for this is because weak links still exist between room A and room B and allow significant sound leakage between them. As described above, such weak links are normally either ignored (e.g., in the "typical" builder case) or addressed with expensive overdesigns (e.g., in the custom builder and acoustic expert case). In addition to those listed above, weak links may also include penetrating items, such as electrical conduit, junction boxes or electrical receptacles, HVAC ducts, water or gas pipes, drain pipes, vents or registers, or any other items which penetrate a wall or floor-ceiling assembly. Weak links may also include construction discontinuities (air leaks, holes, or joint discontinuities), sound transmission or vibration through structural components (e.g., framing members, building boards, or fasteners), and cross-talk through air ducts. In FIG. 7, the weak link, in this case a door path 25, is addressed with a tested component solution and the overall benefit is substantial (i.e., 42 dB drop), compared to the untreated system.

Figure 1:
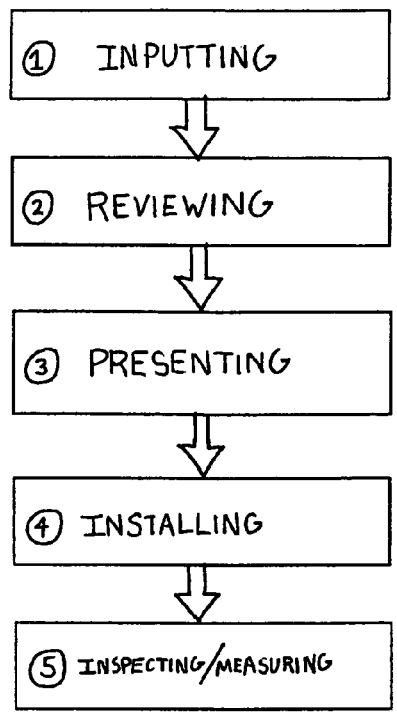
FIG. 1 is a flow chart illustrating one method of enhancing acoustical performance in a residential structure according to the present invention.
Figure 2:
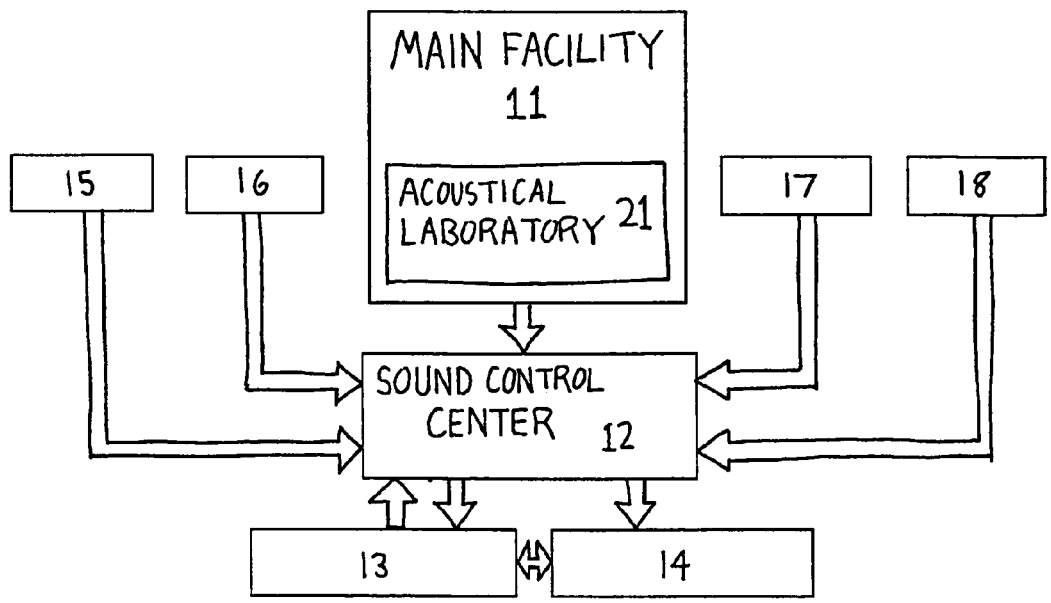
FIG. 2 is a schematic diagram of a residential sound control system according to the present invention.

The process of the present invention begins with a builder desiring to achieve a certain level of sound control performance in the structure, preferably the type of room-to-room performance illustrated in FIG. 7. The desired level of performance could be represented by a room-to-room FSTC rating, based on the overall performance of all of the components acting as a whole, in the manner that the entire system would perform in a field test. The builder may be one who constructs conventional, tract housing for others, or an individual planning to build a custom house or perform retrofitting work on an existing house. The project or structure itself may already be constructed (e.g., and may require additional work, such as a remodel or an addition), or it may exist only as an architectural drawing. Regardless, during the input condition of FIG. 1, the builder forwards the project information to either a main facility 11 or a sound control center 12 of FIG. 2, where in either location a design department (not shown) receives the information. The main facility 11 may be, for example, a manufacturer of sound control materials (e.g., fiber glass products) with branches dispersed in various locations. The sound control center 12 is an entity that receives product and testing information from the main facility 11 and associated subcontractor partners 15-18. The subcontractor partners may, for example, be door, caulk, or plumbing subcontractors, or may be the manufacturers of these products. The sound control center 12 acts as a type of subcontractor or coordinator during subsequent steps of the sound control process.

Information supplied to the design department may contain building plans, specifications, material lists, or any other information related to the structure, including the desired level of acoustical performance upgrade. Building plans may include the general layout of such components as walls, doors, and ducts, and may also include detailed drawings of floor assemblies, including mechanicals. The forwarded information may further include information related to the planned usages of the rooms within the house (e.g., bedroom, exercise room, etc.) and also any space or code restrictions that may preclude any proposed modifications.

The inputting step 1 may be performed by the physical forwarding of documents from a builder to a design department or may involve the electronic transmission of project information from, for example, a remote computer (located at the home builder 13 or the occupant 14) to a central computer (not shown) located at either main facility 11 or sound control center 12. This latter type of transaction may be performed over the Internet (or other remote communications system) and may require all forwarded project information to be of a format compatible with software used in the central computer.

The reviewing step 2 occurs at the design department and entails the reviewing and analysis of received project information and the modification of building plans. During this process, wall and floor-ceiling information included in the project information are reviewed in accordance with the desired performance level of the system. Based on the review, the most practical sound control component solutions are selected to achieve the chosen performance level, and the building plans are modified accordingly to reflect the inclusion of the new components. The upgrade may involve adding to the structure additional material, such as board products, blanket products, and insulation products, or may require the relocation or reconfiguration of existing components, such as directly aligned HVAC ducts or electrical outlets, to create acoustical breaks across the structure. Preferably, the components would be available either from the main facility 11 or any number of subcontractor partners 15-18 working in conjunction with the sound control center 12.

In order to modify building plans with a high confidence level of the final FSTC performance, extensive component and system testing is required. In particular, obtaining such confidence in a final system performance requires that the interaction (e.g., effect on FSTC rating) of every component solution with other component solutions be thoroughly understood through prior testing. Preferably, main facility 11 contains an acoustical laboratory 21, which performs all the required testing in order to maintain data integrity. Testing may also be supplemented or substituted by the use of modeling software, which may be capable of modeling both structural systems and sound sources. Unlike conventional residential sound control methods, the present invention applies tested component and system solutions to every acoustic weak link in the building plan or subsets (i.e., rooms) of the building plan. Such solutions may, for example, be recorded in electronic form and stored in a database located in main facility 11 or sound control center 12. Because all possible solutions and their combinations have been tested to produce a given result (i.e., within a FSTC rating range), predictability of a final system performance is high. Such accuracy and economical efficiency is not possible when using off-the-shelf components and generalized, theoretical principles.

Experimentally-verified solutions involve the use of a wide variety of components, materials, and structural modifications. For example, sound control components can be installed in wall, floor, and ceiling assemblies. Such components can include fiber glass insulation, sound control boards, resilient channels, resilient floor underlayments or toppings, metal studs (or staggered wood studs), resilient studs, and various types of gypsum wallboard. Door solutions may involve the installation of solid core or specially-designed acoustical interior doors with perimeter gaskets and floor seals/sweeps/thresholds. Noise flanking paths between adjacent rooms can be reduced or eliminated by the use of airborne treatments (e.g., barriers or fiber glass insulation) and structural treatments (e.g., isolation pads, structural joist breaks, or sound control boards). Noise transmitted through pipes and air ducts can be reduced by installing liners, foam wraps or pads, and sound control boards. Also, offsetting the positions of penetrations and ducts can eliminate cross-talk between adjacent rooms.

As described above, the solutions are selected based on room-to-room FSTC performance levels specified by a home builder 13 or occupant 14. For example, if the chosen FSTC rating is 40, then all of the components that drive room-to-room acoustic performance are selected based on the most economical and practical solution that yields close to or better than a performance level of FSTC 40 as a system. This balanced approach ensures that none of the components are over-designed and thereby the upgrades provide a maximum benefit for minimum cost.

The reviewing step 2 may be performed by human designers or by a computer. In the latter case, building plans may be scanned and electronically forwarded (e.g., through the Internet) to the design department, where a reviewing computer thoroughly examines the plans, selects a solution or a combination of solutions from a database, and directly modifies the plans.

At the presenting step 3, solutions selected during the reviewing step 2 are presented to the builder 13 from sound control center 12. This presentation preferably includes modified building plans, a bill of materials, and detailed drawings or videos demonstrating how recommended components are to be installed. This information may be either in the form of physical items or may be electronically transmitted through the Internet to a remote computer at the builder location 13.

The received bill of materials informs the builder of the amount and cost for each component associated with the upgrade. Material information, including associated cost, is stored in the sound control center 12 and is preferably updated periodically by main facility 11 and partners 15-18. Preferably, the updates would be electronically filed occur through the Internet, or similar system, from remote computers. Alternatively, the sound control center 12 may provide hyperlinks through the Internet to databases or websites providing material and supplier information.

Installation step 4 involves performing upgrade work based on the solutions presented to the builder. This work may be necessarily performed by sub-contractors and their workers or may be performed by the builder. However, while the scheduling of the work is up to the builder and dependent upon an established construction schedule (e.g., framing, thermal insulation, drywall, etc.), the sound control center 12 may provide other services in a subcontractor mode. As the installation of sound control components necessarily involves the cooperation of several other construction trades, it is helpful for the sound control center 12 to be able to offer inspection services to assure that upgrade components are correctly installed.

Such inspection services are performed at inspecting and measuring step 5 and may, for example, include checking by crews for correct installation and measuring the performance using acoustical test equipment on-site. Inspection services may also include the use of on-site cameras or live-conferencing technology (e.g., through the Internet). In addition, the sound control center 12 may provide work crews of trained installers and inspectors.

The sound control center 12 can also offer to the builder a performance guarantee for the upgrade. For example, if a builder selects an acoustics package system of FSTC 40, then the sound control center 12 could certify that a performance level of FSTC 40 will be achieved if all the determined component solutions by the design department are followed exactly and installed correctly. Sound control center 12 may offer post-construction acoustical testing to determine if the desired level of acoustical performance is reached.

In addition, sound control center 12 is able to compile post-installation information (e.g., from acoustical testing) from each upgrade project and apply it to future upgrade projects. In other words, a design department informed of the actual results of the upgrades will be able to adjust any their testing or analysis methods to improve the reliability of reviewing step 2. In this way, the entire system becomes more efficient and effective with each complete cycle of modifying a set of building plans to measuring the end room-to-room performance.

Sound control center 12 may also provide demonstrations and show homes to potential clients. Individuals interested in receiving information about the a home acoustical performance upgrade may be able to contact the sound control center 12, preferably from remote computers through the Internet, and explore upgrade options and their associated costs.

In this way, the present invention provides a system of unprecedented economical efficiency for a residential home builder in that it is able to apply thoroughly tested component solutions and system solutions to a structure to achieve a high acoustical performance rating at a minimal cost. For example, because of the accuracy of the reviewing process in eliminating weak links, use of the present invention can result in consistent performance levels of system FSTC 40 or better. In contrast, conventional sound control methods only offer up to around levels of system FSTC 25.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A computer-implemented method for enhancing performance of a project, comprising the steps of:

inputting project information and a desired performance level, wherein the project information includes information regarding sound paths between rooms and the desired performance level includes a maximum acceptable noise level within a room;

selecting, by a computer, enhancement solutions from a plurality of enhancement solutions stored in a sound control center based on the project information, wherein each enhancement solution is combinable with another enhancement solution to form combinations of enhancement solutions;

associating a cost including information related to materials cost and labor costs and a system performance rating with each combination of enhancement solutions, wherein each system performance is stored in the sound control center;

choosing a combination of enhancement solutions with a system performance rating equal to or greater than the desired performance level and based on the associated cost;

modifying the inputted project information to incorporate the chosen combination of enhancement solutions; and storing the modified project information.

2. The method of claim 1, wherein the project information comprises building plans for a structure.

3. The method of claim 2, wherein the project information comprises information on the uses of rooms within the structure.

4. The method of claim 2, wherein the project information comprises information on interior structural elements.

5. The method of claim 2, wherein the step of selecting further comprises the step of reviewing the project information to determine improvement areas.

6. The method of claim 5, wherein the enhancement solutions are selected based upon the determined improvement areas.

7. The method of claim 6, wherein the determined improvement areas include acoustical weak links.

8. The method of claim 7, wherein the weak links include penetrating items, construction discontinuities, sound transmission through structural components, and cross-talk through ducts.

9. The method of claim 7, wherein the weak links include components having component performance ratings less than the desired performance level.

10. The method of claim 6, wherein at least one of the enhancement solutions involves the addition of a sound control component.

11. The method of claim 10, wherein the sound control component is a sound control material installed in a wall, floor, or ceiling assembly.

12. The method of claim 10, wherein the sound control component is a material for sealing wall, floor, and ceiling perimeters.

13. The method of claim 10, wherein the sound control component is an acoustically enhanced door.

14. The method of claim 6, where at least one of the enhancement solutions involves the indirect positioning of interior components.

15. The method of claim 14, wherein the interior components comprise electrical outlets, air ducts, and fluid-filled pipes.

16. The method of claim 6, wherein at least one of the enhancement solutions involves the discontinuous construction of structural elements of the project.

17. The method of claim 16, wherein the at least one enhancement solution comprises the staggering of wall studs.

18. The method of claim 16, wherein the at least one enhancement solution comprises the addition of a out line in a floor or floor elements.

19. The method of claim 1, wherein each system performance rating is a field sound transmission class rating.

20. The method of claim 1, wherein the modified inputted information describes a project operating at the desired performance level.

21. The method of claim 1, further comprising the step of presenting the modified project information to the user.

22. The method of claim 21, wherein the modified project information is transferred from the sound control center to a remote computer.

23. The method of claim 1, wherein the modified project information includes a bill of materials.

24. The method of claim 23, wherein the bill of materials includes cost information.

25. The method of claim 24, wherein the modified project information includes of a list of tasks based on the selected enhancement solutions.

26. The method of claim 1, wherein each system performance rating is verified by experimentation.

27. The method of claim 1, wherein the desired performance level is a field system sound transmission rating.

28. The method of claim 1, wherein the desired performance level includes the anticipated noise level in adjacent areas to the rooms.

* * * * *